Aug. 12, 1958  B. F. SKINNER  2,846,779
TEACHING MACHINE
Filed May 12, 1955  4 Sheets-Sheet 1
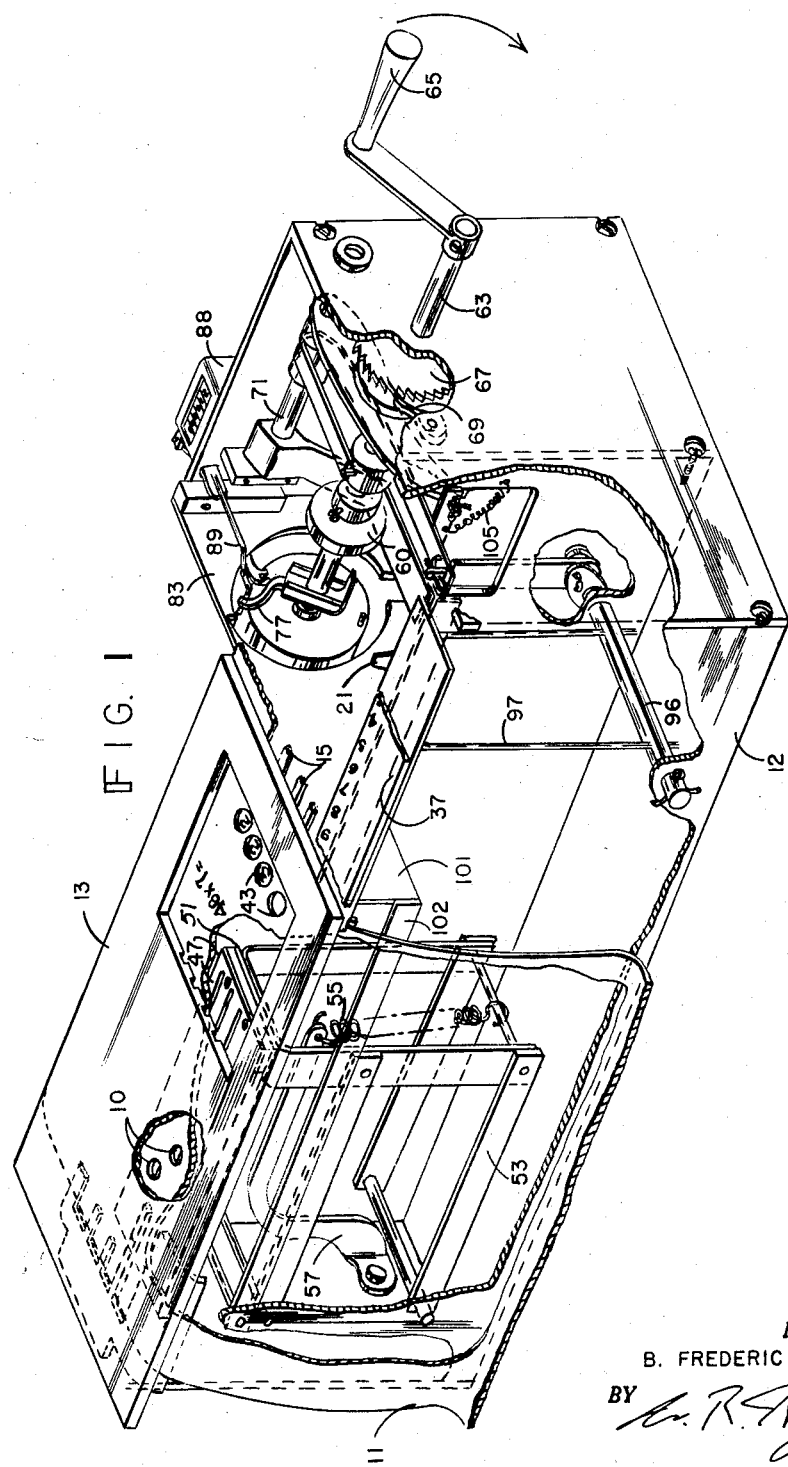
INVENTOR.
B. FREDERIC SKINNER
BY Aug. 12, 1958 — B. F. SKINNER — 2,846,779
TEACHING MACHINE
Filed May 12, 1955 — 4 Sheets-Sheet 2
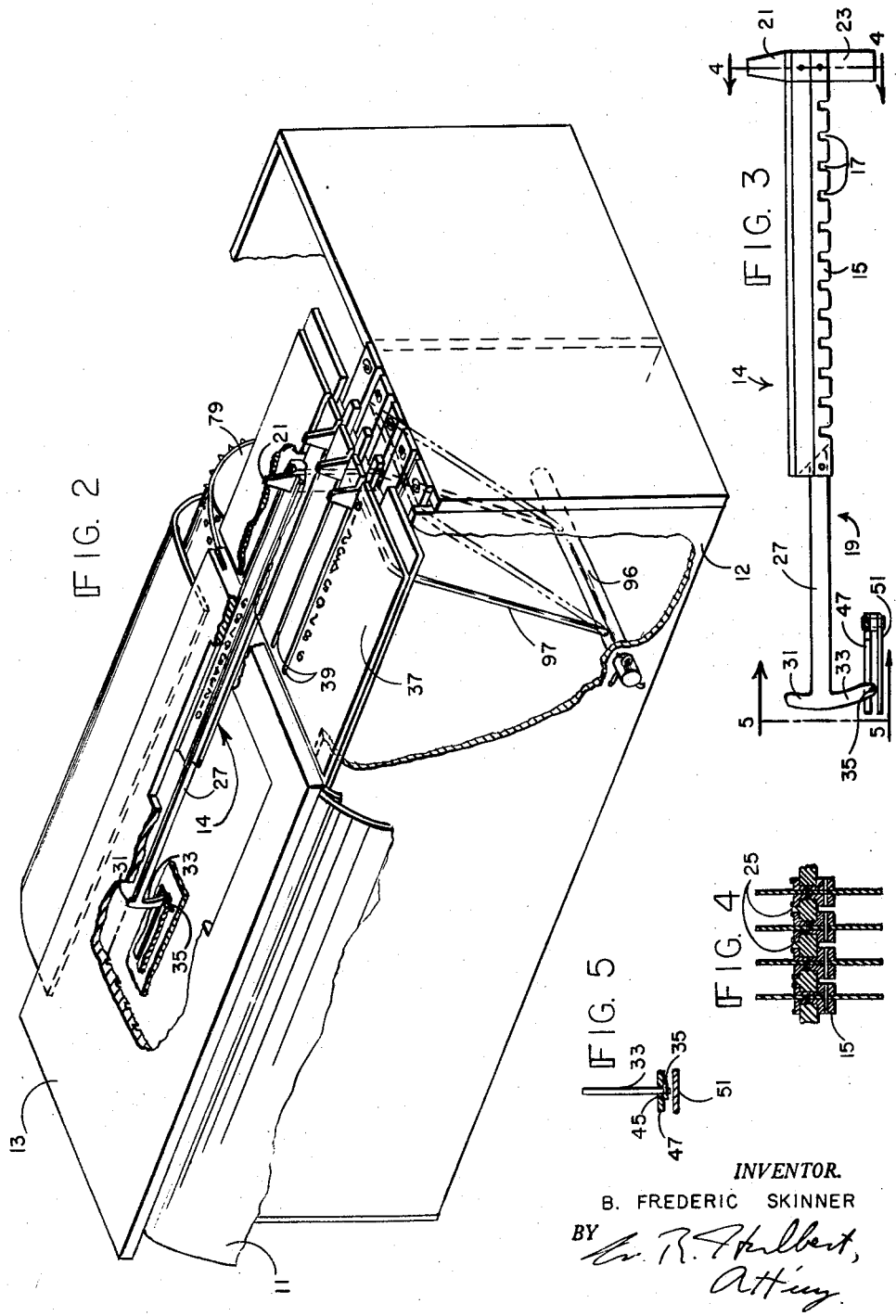
INVENTOR.
B. FREDERIC SKINNER Aug. 12, 1958 B. F. SKINNER 2,846,779
TEACHING MACHINE
Filed May 12, 1955 4 Sheets-Sheet 3
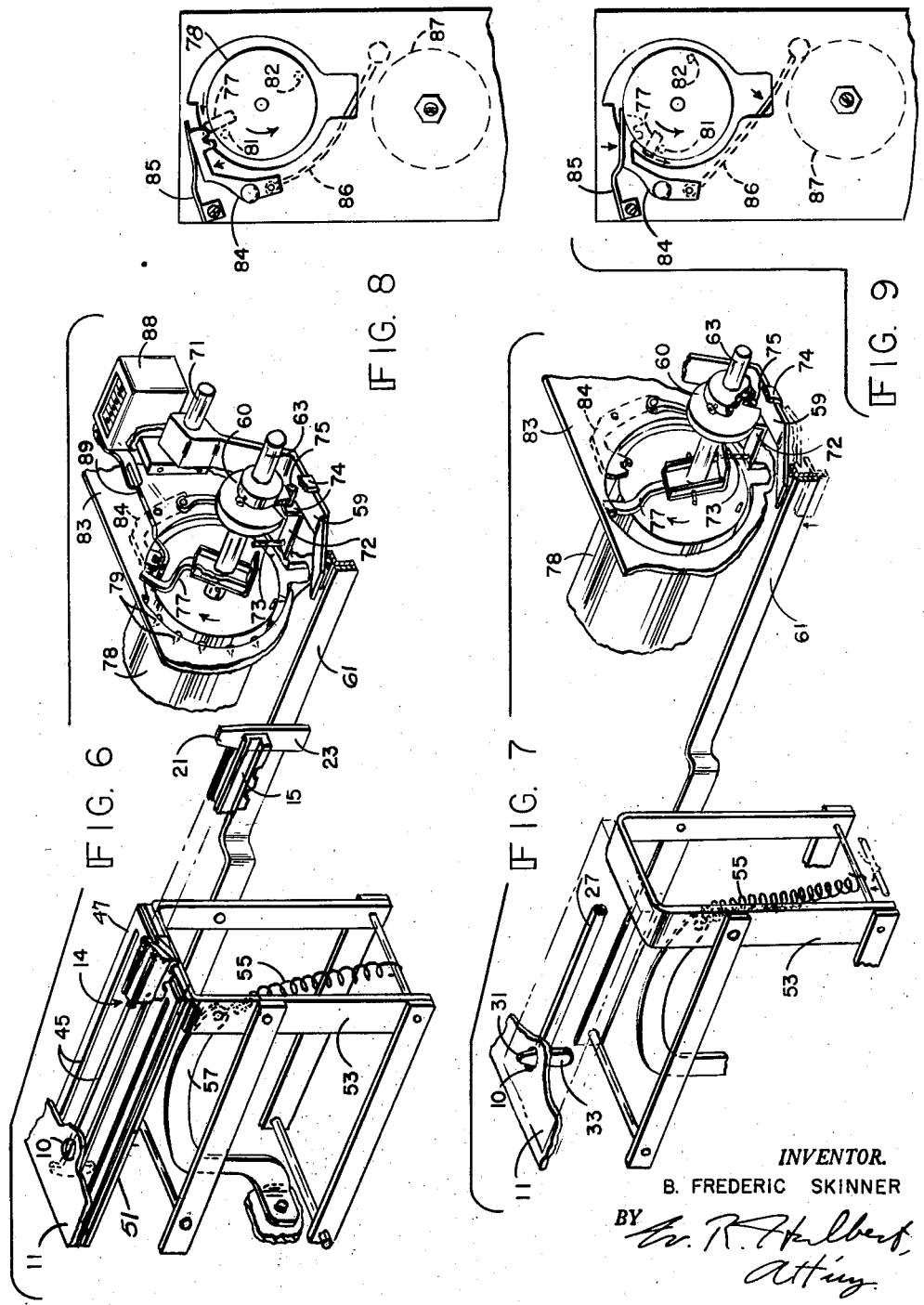
INVENTOR.
B. FREDERIC SKINNER Aug. 12, 1958     B. F. SKINNER     2,846,779
TEACHING MACHINE
Filed May 12, 1955     4 Sheets-Sheet 4
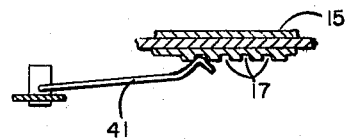
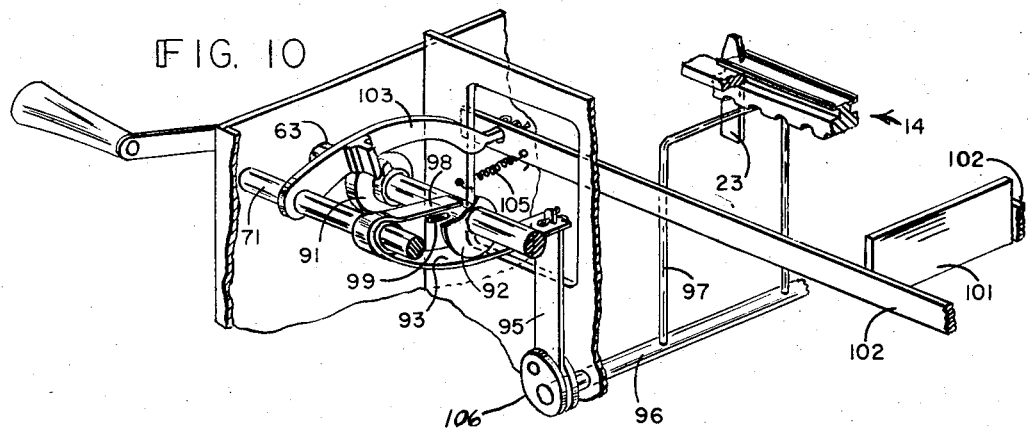
*INVENTOR.*
B. FREDERIC SKINNER

ID PATENT OFFICE 2,846,779
Patented Aug. 12, 1958

2,846,779

TEACHING MACHINE

Burrhus Frederic Skinner, Cambridge, Mass., assignor to International Business Machines Corporation, New York, N. Y., a corporation of New York Application May 12, 1955, Serial No. 507,912

6 Claims. (Cl. 35—9)

This invention relates generally to mechanical aids to teaching, and more particularly, it relates to apparatus for the teaching of arithmetic, spelling, and so forth.

In teaching such an elementary subject as arithmetic, the pupil is presented with visual material, such as that of a problem. The pupil's response to this material, such as his solution, is reported to him as right or wrong. One object of the present invention is to give the pupil this report immediately, and without requiring labor on the part of a teacher. Moreover, as a subject is introduced to the pupil material must be presented in a determined order, beginning with very simple material and moving on to material of a more complex nature. This is also usually done by a teacher, either at a rate determined by the progress of a whole class or, ideally, according to the needs of the individual pupil. It is another object of the present invention to permit the presentation of ordered material at a rate determined by the pupil's progress. Only after reaching a predetermined level of competence, can the pupil move on to the next level.

It is still another object of the invention to provide apparatus of the above-described type which is operable in a manner that will be appealing to the student and will stimulate his interest; and thus in addition to presenting him material appropriate to his development and providing him with immediate results of his work will greatly facilitate the learning process.

Briefly, these and other objects, which will become apparent from the detailed description of the apparatus to follow, are achieved by a novel combination of various mechanisms including a transit mechanism for an information storage medium such as a tape. Carried by one portion of the tape are units of directory intelligence in legible form, for example problems to be solved by the student; and carried by another portion of the tape are the corresponding responses or answers to the problems in the form of spaced coded indicia such as punched holes. Only one of the problems is exposed to view at a time. To enter his solution to the first problem, the student adjusts the positions of a number of movable elements to correspond individually with the components of the answer he has selected. Coupled to the movable elements, are correlation means to register individually with the holes in the tape when the correct answer has been entered. If such an answer has been entered, means are provided to sense the positional correlation with the holes and to indicate same. Although the latter function is preferably performed by a bell in combination with a mechanism adapted to permit the transit mechanism to advance the tape only after the correct answer has been entered, any means for indicating response conformity can be used.

The novel features of this invention will become more readily apparent when considered in connection with the accompanying drawings in which:

Fig. 1 is a perspective view of the apparatus according to the invention including cut-away portions to show various features more clearly;

Fig. 2 is a perspective view similar to that of Fig. 1 except that different portions have been cut away;

Fig. 3 is a view in elevation of the sliders and their associated sensing members whereby an answer is registered in the apparatus of the present invention;

Fig. 4 is a sectional view taken on line 4—4 of Fig. 3;

Fig. 5 is a sectional view taken on line 5—5 of Fig. 3;

Fig. 6 is a perspective view showing certain parts of the apparatus and their operative relations when an incorrect answer has been registered;

Fig. 7 is a perspective view like that of Fig. 6 except that the operative relations of the parts are shown following the registry of a correct answer;

Fig. 8 is a view in elevation of the indicating device employed in the apparatus of the invention just prior to its actuation;

Fig. 9 is a view in elevation of the indicating device of Fig. 8 just subsequent to its actuation;

Fig. 10 is a perspective view of the locking mechanism and a slider return mechanism of the apparatus of the present invention; and Fig. 11 is a cross-sectional view of a portion of one of the sliders and its associated indexing spring.

Referring now to the drawings, and more particularly to Figs. 1 and 2, it will be observed that the apparatus of the present invention includes a tape 11 on which is printed a series of questions which, as shown, may be in the form of arithmetic problems. The tape is provided with a corresponding series of coded punched holes 10 representative of the answers to the questions posed. By way of illustration, a problem in multiplication, 48 times 7, appears on the tape as shown in Fig. 1. Tape 11 is adapted to pass through a housing generally designated as 12, there being provided a masking plate 13 at the top of the housing to expose to view only one of the questions at a time. To register an answer to the exposed one of the questions or problems, there are provided a number of sliders 14 corresponding respectively to the components of the answer, or more specifically, in the case of an arithmetic problem, to the digit columns required to compose an answer. As best seen in Figs. 3, 4 and 5, each of the sliders 14 is made up of a channeled member 15 having on its undersurface a series of slots 17; and a sensing or correlation member 19 pivotally joined to one end of the channeled member. The other end of the channeled member 15 is provided with a pair of tabs 21 and 23 projecting oppositely and at right angles to the channel member. A series of blocks 25 (Fig. 4), rigidly fastened to the housing, serve as guides for the sliders so that they may be moved ahead any desired amount.

Each sensing member 19, as shown in Fig. 3, has an arm portion 27 and, at its end remote from the channeled member, a hammer portion which in effect consists of an upwardly projecting finger 31 and a downwardly projecting tab 33 carrying a cross pin 35. As will become more readily apparent, the fingers 31 of the various sliders are adapted to register with the holes in the tape 11 when the sliders have been positioned to represent the correct answer to the problem. That is to say, at the top of housing 12 there is provided a plate 37 having a series of slots 39 therein through which the tabs 21 of the sliders project; and along the sides of the various slots 39 there are printed the numbers 0 through 9. Thus, in composing or registering an answer to the problem, tabs 21 are movable to respective positions adjacent the components or digits of the answer printed beside the slots 39. As an aid to insuring that the sliders and their associated sensing members 19 will be accurately positioned in accordance with the digits sought to be registered, there is provided an indexing spring 41 for registry with the slots 17 in the undersurfaces of the channeled members, as best shown in Fig. 11. It has also been desirable from the standpoint of facilitating the operator's understanding of the manner in which an answer is registered to provide the tape 11 with a series of circular apertures 43; and to print along the top surfaces of the channel member the digits 0 through 9, whereby the components or the digits of the answer selected will appear in tabular form through the holes in the tape.

As best shown in Figs. 1, 3, 5 and 6, the projections or tabs 33 on the sensing member 19 ride in slots 45 formed in a plate 47 (Figs. 3 and 5), the lower extremities of the projections 33 extending adjacent a lower plate 51 parallel to and spaced a short distance from upper plate 47. Mounting plates 47 and 51 is a pivotal support structure (Figs. 6 and 7), generally designated as 53 normally urged in an upward direction by means of a tension spring 55 having one of its ends connected to the support structure and the other of its ends connected to a fixed arm 57. Normally urging support structure 53 in the opposite direction, that is downwardly, so that fingers 31 are maintained just below or adjacent the punches in the tape is a lever 59 in operative engagement with an arm 61 extending from the support structure (Fig. 7). Lever 59 is acted upon by a cam 60 rigidly mounted on a shaft 63 extending transversely of the tape. Shaft 63, as shown in Fig. 1, extends through the housing 12, and is provided with a crank handle 65 and a ratchet wheel 67 for engagement with a pawl 69 to permit only clockwise rotation of the shaft by the crank handle.

Referring now to Figs. 6 and 7, it will be observed that lever 59 is pivotable on a pin 71 rigidly fastened to the housing, and carries a cross arm 72 having a vertical pin 73 affixed thereto. Lever 59 also carries a pair of short upright bars 74 supporting between them a horizontal pin 75. Pin 75 rides on the cam 60, and by virtue of the rigid connection of pin 75 to the lever 59, the latter is urged downwardly by the cam during most of its travel. However, lever 59 will be permitted to be lifted momentarily by arm 61 extending from the plate assembly support structure 53 owing to a wedged-shape cut in the periphery of the cam.

In the event that lever 59 is raised by arm 61 as a result of all of the fingers having been caused to register with holes in the tape, vertical pin 73 then strikes against a pivotal arm 77 mounted on shaft 63 for rotation therewith, pivoting the upper portion of this latter arm towards the tape, that is towards the left of Figs. 1, 6 or 7. As best shown in Figs. 7, 8 and 9, arm 77 forms a part of a tape transit mechanism whereby the tape 11 is advanced when the drive shaft 63 is rotated. More particularly, a tape 11 passes over a drum 78 carrying sprocket teeth 79 adapted to register with a series of perforations provided in the tape for this purpose. Projecting axially from the drum 78 toward the plane at rotation of arm 77 is a pair of pins 81 and 82. Disposed transversely to the axis of drive shaft 63, which is journaled in the drum 78, is a plate 83. Plate 83 is apertured to permit arm 77 to pass therethrough when in approximately vertical position and thereafter to maintain the arm toward the drum for 180 degrees. During this latter time, arm 77 is adapted to engage one of the pins 81 or 82 causing the drum 78 to rotate 180 degrees and the tape 11 to be advanced.

At approximately the same time as arm 77 picks up one of the pins 81 or 82, it is also adapted to lift a pivot arm 84 urged downwardly by means of a leaf spring 85. Except when this pivot arm is lifted by arm 77 it engages pin 81 or 82 to lock the drum and sprocket carrying tape 11, thus precisely indexing the holes for more accurate sensing. Attached to the lower end of the pivot arm 84 is a bell striker 86 which rings a bell 87 as shown in Figs. 8 and 9, shortly after the tape begins to advance. In the event that an incorrect answer has been registered so that arm 77 is not acted upon by vertical pin 73, then the arm passes on the near side of plate 83 (Fig. 1), and an error counter 88 having an arm 89 for engagement with arm 77 is actuated, as seen in Fig. 6.

Referring now to Fig. 10, it will be observed that shaft 63 also carries a pair of cams 91 and 92, the latter being adapted to act upon a lever arm 93 pivotally mounted on pin 71. Lever arm 93 is in turn connected to a crank arm 95 which turns a shaft 96 through a short arm 103. Attached to shaft 96 is a bail 97 for engagement with the downwardly projecting tabs 23 of the sliders 14 to return the latter to their initial "blank" positions approximately one step removed from the columns of numbers printed on plate 37. An auxiliary arm 98 rigidly attached to and pivotable with arm 93 is adapted to be engaged by a pin 99 projecting radially from shaft 63; pin 99 engaging with arm 98 prevents rotation of shaft 63 after the sliders 14 have been returned to reset position. When at least one of the sliders 14 is moved from its reset position, evidencing that a new answer has been registered, bail 97 acting through shaft 96 and arms 106 and 95, lifts the cam arm 93 and with it arm 98, thus disengaging pin 99 and allowing shaft 63 to be turned.

Finally, according to the invention, there is provided a locking mechanism to lock the sliders in position during the time that the accuracy of the answer registered is being sensed; namely when pin 75 on lever arm 59 enters the wedge in main cam 60 as already described. Such locking mechanism includes a locking bar 101 to engage an aligned row of slots in the undersurfaces of the sliders 14; and a pair of bar support members 102 provided with a pivotal mounting (not shown) toward the right of Fig. 10. Coupled to one of the members 102 is a rocker arm 103 having its end remote from member 102 pivoted on pin 71. Cam 91, aforementioned, is adapted to engage a camming projection on rocker arm 103 to raise same momentarily thereby lifting the locking bar into the slots in the sliders, while the tape is being sensed. Alternatively, when cam 91 is not acting upon rocker arm 103, a tension spring 105 urges member 102 downwardly and hence maintains locking bar 101 out of engagement with the sliders.

In operation the tape is threaded between the roll and the masking plate with the edge perforations in registry with the sprocket teeth so that the first problem to be solved is exposed to view through the aperture in the masking plate. To compose an answer to the problem, the operator moves the tabs corresponding to the components of the answer, that is the digits, of the various digit columns so that the tabs lie adjacent the appropriate digits printed on the plate 37. A ready check as to whether the answer desired to be entered has actually been entered can be made with reference to the numbers printed on the sliders that are visible through the holes 43 provided in the tape. The operator then turns the crank 65 in a clockwise direction thereby rotating the main drive shaft 63 and with it cam 60. As soon as the wedge-shaped cutout in cam 60 reaches the pin 75 associated with lever 59, lever 59 will be effectively relieved of the downward force of the cam and therefore will be free to be moved upwardly under the influence of arm 61 extending from the plate assembly support structure. Assuming for the moment that the correct answer to the problem has been registered so that each one of the fingers is positioned adjacent a corresponding hole in the tape, then the plate assembly will be moved upwardly under the influence of tension spring 55 moving with it the fingers 31. In particular, the lower plate 51 will come in contact with the lower extremities of the projections 33, pivoting the sensing or correlation members 19 so that the fingers are moved substantially upwardly through the holes. The resulting displacement of the plate assembly is then reflected in upward motion of vertical pin 73 projecting from cross arm 72 of lever 59, the vertical pin striking against the undersurface of pivotal arm 77 so that the radial extremity of the latter is urged toward the drum 78. Such movement of arm 77 is sufficient to place the end of the arm on the side of plate 83 opposite from the cam 60, that is towards the left of Figs. 6 and 7. At approximately the same time the sensing operation performed by cam 60 is terminated. Further rotation of the crank and drive shaft 63 then brings the arm 77 into engagement with the pivot arm 84 and by lifting this arm frees the pin 81 or 82 so that the drum is free to rotate. Arm 77 then engages pin 81 or 82 and the drum 78 will be caused to rotate with the shaft 63 until the opposite pin 82 or 81 is locked by arm 84 thereby advancing and registering the tape to expose to view the next succeeding problem. Shortly after this rotation begins, the striker on pivot arm 84 falls, ringing the bell. During rotation of the drum plate 83 insures that arm 77 remains in engagement with pin 81 or 82 by virtue of the aperture therein being contoured to prevent further pivotal movement of the arm until the drum has been rotated approximately 180 degrees. At this point a spring (not shown) pivots the arm away from the drum and back through the aperture in plate 83, so as to place the apparatus in condition to sense the correctness of the answer registered to the next problem.

If it be assumed that the first answer registered were incorrect, resulting in at least one of the fingers being positioned adjacent the tape itself rather than one of the holes, it would follow then that no displacement of the plate assembly could occur since the tape prevents the fingers from rising and so also the plate assembly. In this event, pivotal arm 77 will remain as it was at the start of the operations insofar as movement towards or away from the drum is concerned, so that when shaft 63 is rotated, arm 77 will be on the side of plate 83 away from the drum. Hence, it will not engage the pivot arm 84 or either of the pins 81 or 82 and therefore will not be effective to rotate the drum and advance the tape or ring the bell. Rather it will come in contact momentarily with arm 89 extending from counter 88 to register an error.

In order to prevent a series of answers being registered and tested by the operator without his having turned the crank the required full revolution after the entry of an answer, locking bar 101 is raised into the slots 17 in the members 15 thereby preventing movement thereof during the time the plate assembly is permitted to rise. That is to say, at the same time that horizontal pin 75 mounted on lever 59 falls into the cutout on main cam 60, the lobe on cam 91 lifts the arm 103 pivoting member 102 upwardly so that the locking bar becomes operative to lock the sliders. As soon as horizontal pin 75 is once again operatively engaged by cam 60 at the end of the sensing operation, arm 103 comes off the lobe of cam 91 and is urged downwardly under the influence of tension spring 105, until it bottoms on the substantially circular portion of the cam periphery, thus unlocking the sliders so that they may be reset.

During the time the drum is being rotated by shaft 63 due to the engagement of pin 81 or 82 by arm 77, the remaining cam 92 forces arm 93 downward against vertical arm 95 which turns arm 106 and shaft 96 in a clockwise direction. The bail 97 mounted on shaft 96 sweeps in a counterclockwise direction as shown in Fig. 10. As previously mentioned, bail 97 is thus brought to bear on the downwardly projecting tabs 23 of the sliders so that all of the sliders are automatically returned to their starting positions. This occurs whether or not the correct answer has been registered. Radial pin 99 on shaft 63 is then arranged to strike against the edge of auxiliary arm 98 so that main shaft 63 cannot be rotated further. However, as soon as at least one of the sliders is moved forward as would be the case in composing a new answer, the pivotal movement of bail 97 in the reverse direction caused by the tab 23, turns arm 106 clockwise in Fig. 10, lifting arms 95 and 93 thus lifting auxiliary arm 98, which is rigidly attached to arm 93 out of engagement with radial pin 99 so that thereafter, when the operator has completed his answer, he may then turn the crank in order to effect the various operations aforementioned.

Although the preferred embodiment of the apparatus illustrated is adapted for the practice of mathematical problems, it is apparent that it might also be used for instruction in spelling, reading and various other language skills. Similarly, those making use of the apparatus may find it advantageous to provide in addition to the bell some device which would give a bonus reward on some unpredictable schedule as a special inducement to the operator to continue to play the machine after a certain number of correct answers have been entered. It may also be found convenient to adapt the machine for use with a storage medium in the form of a disk or card rather than a tape, or to provide for the registry of an answer by means of keys rather than sliders.

Therefore, it should be understood that the embodiment of the invention illustrated is merely exemplary and is susceptible of various modifications within the spirit and scope of the invention defined by the appended claims.

What is claimed is:

1. Apparatus for the teaching of arithmetic or the like, said apparatus comprising a tape carrying a series of questions in printed form and the corresponding answers thereto in the form of coded punched holes, a housing structure for said tape including a masking plate to expose only one of said questions to view at a time, manually operable means to register an answer to the exposed one of said questions including a plurality of movable elements whose respective positions are representative of the components of the answer to be registered, a plurality of fingers individually coupled to said movable elements, said fingers being positioned adjacent said holes by said movable elements when the positions of the latter are collectively representative of the answer carried by the tape, a scale pan assembly to urge said fingers through the holes and thereafter to return said fingers to their original positions adjacent the tape, an actuating mechanism for said scale pan assembly, a tape transit mechanism, means to condition said tape transit mechanism to advance the tape in response to a displacement of said scale pan assembly, an indicating device actuated by said tape transit mechanism, and a main drive shaft coupled to said actuating mechanism and to said tape transit mechanism to motivate same.

2. Apparatus according to claim 1 wherein the actuating mechanism for said pan assembly comprises a cam rigidly mounted on said drive shaft, a lever for intermittent operative engagement with said cam, a pivotal support structure mounting said pan assembly, said structure being acted upon by said lever intermittently to urge said pan assembly away from the tape, and biasing means urging said pan assembly towards the tape.

3. Apparatus according to claim 2 wherein said tape transit mechanism comprises a drum over which said tape is passed, a sprocket wheel rigidly attached to said drum, said tape being provided with a series of perforations along one of its edges for engagement with said sprocket wheel, a rotatable arm pivotally mounted on said drive shaft, and means projecting from said drum for engagement with said arm.

4. Apparatus according to claim 3 wherein said means to condition said tape transit mechanism to advance the tape comprises an element attached to said lever to pivot said arm towards said drum when said lever is out of engagement with said cam and displacement of said scale pan assembly occurs.

5. Apparatus for teaching comprising an information storage medium carrying a series of units of printed intelligence and a corresponding series of units of related intelligence in the form of physically distinctive indicia capable of being sensed, means to advance said storage medium to expose said first-named units to view consecutively, manually operable means to register a response to each one of the units of said first series including a plurality of movable elements whose respective positions are representative of the components of the response registered, correlation means coupled to said movable elements to register with said indicia when the positions of said movable elements are collectively representative of the corresponding unit of said second-named series carried by the storage medium, means to sense the registry of said correlation mens with said indicia and thus to indicate the conformity between said corresponding unit of said second-named series and said response, and a locking mechanism to fix the positions of said movable elements while said last-named means is operable to sense the registry of said correlation means with said indicia.

6. Apparatus for teaching comprising an information storage medium carrying a series of units of printed intelligence and a corresponding series of units of related intelligence in the form of coded punched holes, means to advance said storage medium to expose said first-named units to view consecutively, manually operable means to register a response to each one of the units of said first series including a plurality of movable elements whose respective positions are representative of the components of the response registered, correlation means including a plurality of fingers coupled to said movable elements to register with said holes when the positions of said movable elements are collectively representative of the corresponding unit of said second-named series carried by the storage medium, and means to sense the registry of said correlation means with said holes and thus to indicate the conformity between said corresponding unit of said second-named series and said response, said last-named means including a plate adapted to urge said fingers against said storage medium and through said holes when in registry therewith.

References Cited in the file of this patent

UNITED STATES PATENTS

| | | |
|---|---|---|
| 1,660,501 | Gleason | Feb. 28, 1928 |
| 1,749,226 | Pressey | Mar. 4, 1930 |
| 2,200,206 | Myers | May 7, 1940 |
| 2,564,089 | Williams et al. | Aug. 14, 1951 |